US006557461B2

(12) United States Patent  (10) Patent No.: US 6,557,461 B2
Sherwin  (45) Date of Patent: May 6, 2003

(54) APPARATUS FOR COOKING POULTRY

(76) Inventor: Richard B. Sherwin, 15519 129th St., Lemont, IL (US) 60439

( * ) Notice: Subject to any disclaimer, the term of this patent is extended or adjusted under 35 U.S.C. 154(b) by 0 days.

(21) Appl. No.: 10/190,259

(22) Filed: Jul. 8, 2002

(65) Prior Publication Data

US 2003/0019862 A1 Jan. 30, 2003

Related U.S. Application Data

(62) Division of application No. 09/894,747, filed on Jun. 28, 2001, now Pat. No. 6,416,804.

(51) Int. Cl.[7] .................... A23L 1/00; A22C 21/00; A47J 37/00; A47J 37/04
(52) U.S. Cl. ............... 99/419; 99/345; 99/426; 99/447
(58) Field of Search ................ 99/339, 340, 345–347, 99/400, 401, 419–421 V, 426, 427, 444–450, 441, 442; 426/282, 132, 420, 523, 644

(56) References Cited

U.S. PATENT DOCUMENTS

| 1,485,253 | A | 2/1924 | Devlin |
| 1,979,501 | A | 11/1934 | Stepkin |
| 2,404,166 | A | 7/1946 | Danilla |
| 2,835,480 | A | 5/1958 | Perez |
| 2,918,561 | A | 12/1959 | Perez |
| 3,584,683 | A | 6/1971 | Gordon |
| 3,709,141 | A | 1/1973 | Schwartzstein |
| 3,899,657 | A | 8/1975 | Johnson |
| 3,965,808 | A | 6/1976 | Chomette |
| 3,980,010 | A | 9/1976 | Collinucci |
| 4,127,060 | A | 11/1978 | Curtis |
| 4,194,015 | A | 3/1980 | Colato |
| 4,294,168 | A | 10/1981 | Redhead |
| 4,301,509 | A | 11/1981 | Haase et al. |
| 4,738,192 | A | 4/1988 | Odom, Jr. |
| 4,810,856 | A | 3/1989 | Jovanovic |
| 5,106,642 | A | 4/1992 | Ciofalo |
| 5,301,602 | A | 4/1994 | Ryczek |
| 5,586,489 | A | 12/1996 | Fraga |
| 5,662,028 | A | 9/1997 | Fraga |
| 5,690,980 | A | 11/1997 | Fraga |
| 5,893,320 | A | 4/1999 | Demaree |
| 5,918,534 | A | 7/1999 | Medina |
| 6,416,804 | B1 * | 7/2002 | Sherwin ............. 426/282 |

OTHER PUBLICATIONS

"Make Food Safety a Holiday Tradition," CNN Web–site, Nov. 21, 2000, URL:http://www.CNN.com/2000/Food/News/11/21/food safety.
"Food Safety Myths and Facts," Patsy H. MacNeil, NC State University Cooperative Extension Web Site, URL:http://www.ces/state/nc.us/articles/patsy/foodillnes.htm.
"Foodborne Diseases," Patient's Guide Web Site, URL:http://www3.bc.sypatico.ca/me/patientsguide/food-brn.htm.
"Food Poisoning," UC Davis Wellness Center Web Site URL:http://wellness.ucdavis.edu/safety_info_prevention/ . . . /food_poisoning.htm.
"Stop That Stuffing! The USDA Issues an Early Thanksgiving Health Warning," Carol Sugarman, Washington Post, Aug. 14, 1996; p. E1.

* cited by examiner

Primary Examiner—Timothy F. Simone
(74) Attorney, Agent, or Firm—Charles F. Maroni, Jr.

(57) ABSTRACT

A segmented elongate, hollow convection pipe formed with an angled mid portion which extends through the body cavity of stuffed poultry during cooking. The device is provided in plural individual sections of tubing that are serially joined in a nested fashion. Overall length of the device can be grossly adjusted by selecting greater or fewer numbers of sections of tubing to form the device, and finely adjusted by telescopically sliding the sections relative to each other. The angled mid portion may be provided as a fixed angle, or provided as a selectively adjustable angle to accommodate anatomical differences in poultry. Overall cooking time of both the poultry and the stuffing is uniform and reduced as a result of cooking from the inside as well as the outside. A method is provided for using the convection pipe to safely, quickly, and uniformly cook a raw, stuffed poultry.

29 Claims, 3 Drawing Sheets

APPARATUS FOR COOKING POULTRY

PRIOR HISTORY

This is a Divisional Application of U.S. patent application Ser. No. 09/894,747 filed Jun. 28, 2001 now U.S. Pat. No. 6,416,804.

BACKGROUND OF THE INVENTION

Every year, the Centers for Disease Control and Prevention Estimates that 300,000 people in the United States are hospitalized, and 5,000 people, mostly the very young, the elderly and those with compromised immune systems, die from food borne illness. A staggering 76 million people are sickened due to food borne illnesses[1]. These numbers are conservative because millions of mild cases of food borne illnesses which occur in private homes go unreported. The U.S. Public Health Service cited the four most serious bacteria that cause these illnesses are *E. coli,* Salmonella, *Listeria monocytogenes* and *Campylobacter jejuni*[2]. These bacteria are commonly found in meat, poultry, eggs, and on vegetables.

Food borne illness is also extremely costly; the estimated yearly cost of food borne diseases in this country is $5 to $6 billion in direct medical expenditures and lost productivity, stated in an article in Patients Guide Index[3].

In an article dated Nov. 21, 2000 on CNN.com, Michael Doyle, Director of the Center for Food Safety at the University of Georgia states, "Most poultry contain harmful bacteria. Recent statistics show about 60% of chickens are contaminated with camplobacter and 10% with Salmonella. Turkeys tend to be slightly higher. It's important that we think about fresh poultry containing potentially harmful bacteria.[1]"

An estimated 55 percent of food poisoning cases are caused by improper cooking and storage of foods[4]. In poultry production, poultry handlers who do not wash their hands after going to the bathroom and returning to work can contaminate carcasses with *E.coli.* The carcass itself may be contaminated with Salmonella from the intestinal tract of the bird. While these small amounts of bacterial contamination may not be a danger in and of themselves, given the right conditions they can lead to serious illness or death.

It is well known that these harmful bacteria can be eliminated from food products by proper cooking regimens. In the case of poultry, cooking the product until it reaches an internal temperature of 165 degrees F. will kill the bacteria, and the food is considered safe for eating. Unfortunately, the USDA reports that 50% of cooks do not bother with a meat thermometer, which the USDA sees as a critical problem. Cooks who do not use thermometers rely on how the bird looks or use cooking charts on the packaging. These methods can be unreliable because oven temperatures vary so widely. The problem is further compounded by the practice of stuffing poultry prior to cooking it. The combination of poultry and stuffing increases cooking times. Additionally, it is common for home cooks to stuff the turkey using traditional recipes that include ingredients such as clams, oysters, turkey giblets and raw eggs, which carry their own bacteria as well. In an article from the Washington Post, Aug. 14, 1996, the USDA warns cooks not to stuff turkeys[5].

Meat thermometers can be used to verify proper internal cooked temperature. However, when poultry is stuffed, the poultry itself reaches the safe temperature of 165 degrees Farenheit (74 degrees Celsius) long before the stuffing itself. By the time the stuffing has reached 165 degrees F., the meat of the poultry has been overcooked and is less appetizing. Thus, poultry is often removed from the oven when the meat is done, resulting in improperly cooked stuffing. Other factors which contribute to contamination of food with bacteria include the practices of stuffing the turkey the night before, the use of raw meats and/or raw eggs in the stuffing, and improper sanitation methods such as poor hand washing.

A need exists for a device which will allow uniform cooking of the both the poultry product and the stuffing so that both reach the safe cooking temperature of 165 degrees F. at approximately the same time.
1. "Make Food Safety A Holiday Tradition," CNN Web Site, Nov. 21, 2000.
2. "Food Safety Myths and Facts," Patsy H. MacNeill, NC State University Cooperative Extension Web Site.
3. "Foodborne Diseases," Patient's Guide Web Site,.
4. "Food Poisoning", UC Davis Wellness Center Web Site.
5. "Stop That Stuffing! The USDA Issues an Early Thanksgiving Health Warning," Carole Sugarman, *Washington Post*, Aug. 14, 1996; page E1.

SUMMARY OF THE INVENTION

Consumers are aware of the risks of food borne illness when preparing stuffed poultry, yet continue prepare this food in the traditional way. An innovative convection poultry pipe is described, which when used in cooking stuffed poultry, causes the temperature of the stuffing to exceed the temperature of the turkey breast meat by allowing the heat from the oven to be convected through the center of the stuffing. This allows a rapid heating of the interior of the poultry and provides a safer end food product. Overall cooking time of both the poultry and the stuffing is reduced as a result of cooking the turkey from the inside as well as the outside.

The innovative convection poultry pipe is a generally elongate, hollow metal pipe formed with a an angled mid portion. The convection poultry pipe extends completely through the body cavity of the poultry so that it extends from both ends of the carcass. It is supported within the body cavity by being surrounded by stuffing. The convection poultry pipe is placed within the cavity so that the angled mid portion is located adjacent to the small opening between the breastbone and back at the neck end of the poultry, and allows the open ends of the convection poultry pipe to lie above the bottom of the pan so that they are clear of stuffing and cooking liquids, assuring proper airflow through the convection poultry pipe.

The convection poultry pipe is provided with several features which allow it to be used on poultry of greatly varying size, from cornish hens to large turkeys. The device is provided in plural individual sections of tubing that are serially fitted together, end to end, in a nested fashion. Overall length of the convection poultry pipe can be grossly adjusted by selecting greater or fewer numbers of sections of tubing to form the device. Since the device is formed of plural individual sections that are fitted together end to end in a nested fashion, the device can be telescopically adjusted to make fine adjustments in desired overall length and positioning of the angled mid portion. The angled mid portion may be provided as a fixed, or rigid, angle, or may be provided as a selectively adjustable angle to accommodate anatomical differences in various poultry products.

DETAILED DESCRIPTION

Figure 1:
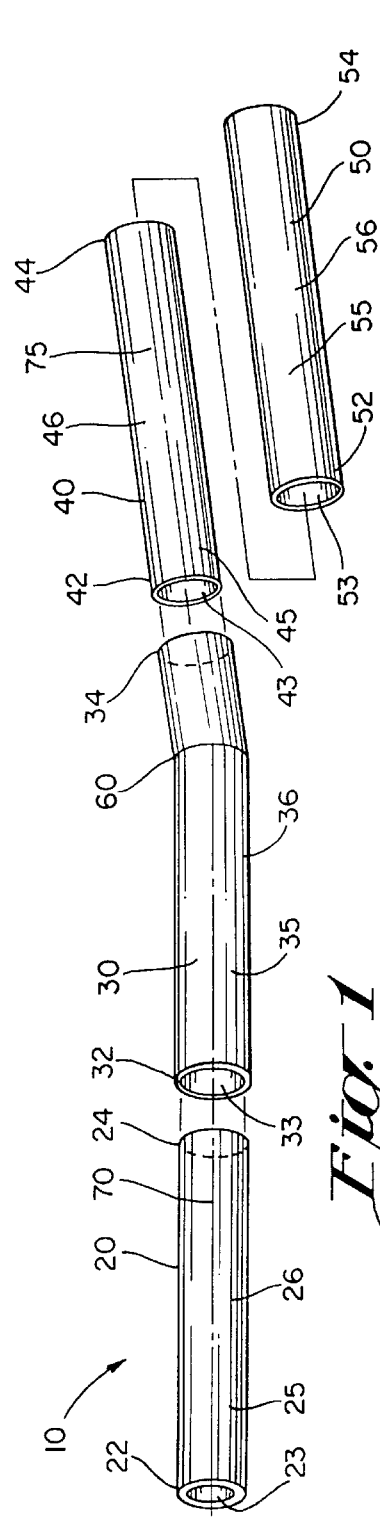
FIG. 1 is an exploded perspective view of the poultry convection pipe.
Figure 2:
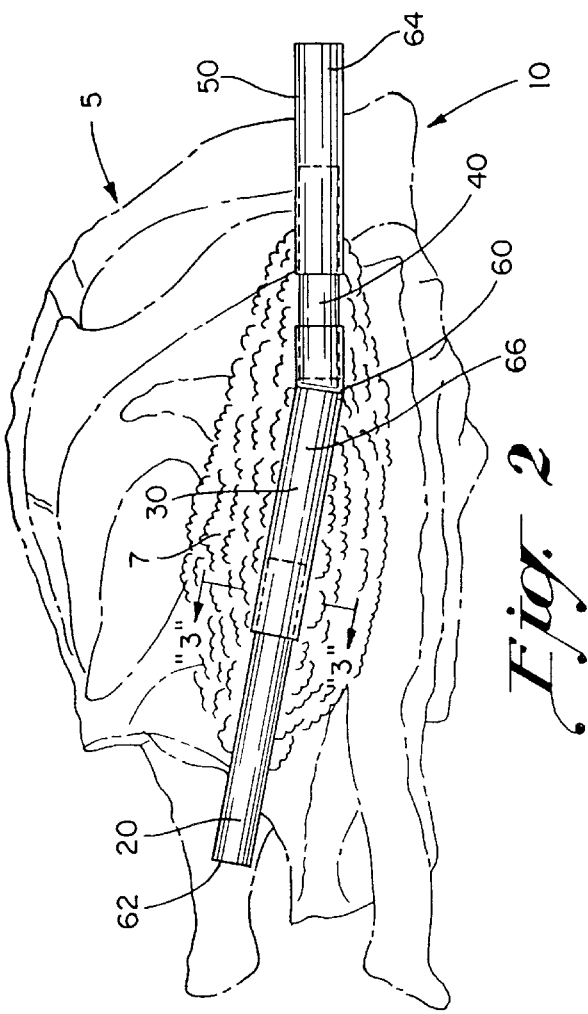
FIG. 2 is a side view of the assembled poultry convection pipe, illustrating its position and orientation within a typical stuffed poultry, the stuffed poultry shown in phantom.
Figure 3:
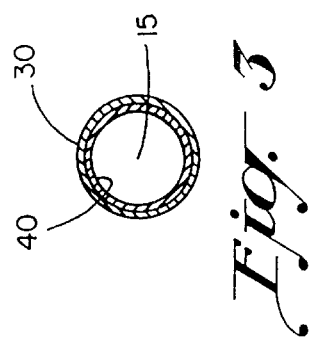
FIG. 3 is a sectional view of the poultry convection pipe across line 3—3 in FIG. 2, illustrating the nested configuration of the telescoping components of the convection pipe.

Referring now to FIGS. 1, 2, and 3, the inventive poultry convection pipe 10 is an elongate hollow tube of generally uniform diameter. Convection pipe 10 is constructed from a plurality of short, individual sections 20, 30, 40, 50 of hollow tube. Each individual section 20, 30, 40, 50 can be separated from the remaining sections, and in use are assembled together in series so as to form a single, elongate tube which is telescopically adjustable. Convection pipe 10 comprises pipe first end 62, pipe second end 64, and pipe mid portion 66 which lies between and separates pipe first end 62 from pipe second end 64.

Pipe first end 62 comprises a first longitudinal axis 70. Pipe second end 64 comprises a second longitudinal axis 75. First longitudinal axis 70 is non-parallel to second longitudinal axis 75, and first longitudinal axis 70 intersects second longitudinal axis 75 in pipe mid portion 66 so as to form angle 60.

In the preferred embodiment, convection pipe 10 is used within a large turkey 5 which has been eviscerated and the body cavity filled with stuffing 7. Convection pipe 10 is supported within the body cavity, and surrounded by, stuffing 7. Convection pipe 10 is provided in a length such that pipe first end 62 extends outside the body cavity adjacent to the tail end of turkey 5, and pipe second end 64 extends outside the body cavity adjacent to the neck end of turkey 5. Preferably, angle 60 is positioned within the body cavity so as to lie adjacent to the neck, end, in the narrow opening between the breastbone and back of turkey 5. When properly oriented and supported by stuffing 7, first end 62 of convection pipe 10 lies above both angle 60 and second end 64. Most preferably, second end 64 lies at, or slightly below, the horizontal plane.

In the preferred embodiment, convection pipe 10 comprises at least three short, individual sections 20, 30, 40 of elongate hollow tube of circular cross section, the elongate hollow tube having a circular longitudinal bore such that air flow from the first end to the second end is free and uninterrupted. These three sections comprise a first section 20, a second section 30, and a third section 40. Employment of three individual sections to form convection pipe 10 is excellently suited for use in cooking stuffed duck, chicken, and small to medium sized turkey 6 (see FIG. 5).

First section 20 and third section 40 each are provided with a first outer diameter and a first inner diameter, an open section first end 22, 42, an open section second end 24, 44, a section mid portion 26, 46 which lies between the open section first end 22, 42 and the open section second end 24, 44, an interior surface 23, 43, and an exterior surface 25, 45. Second section 30 is provided with a second outer diameter and a second inner diameter, an open section first end 32, an open section second end 34, a section mid portion 36 which lies between the open section first end 32 and the open section second end 34, an interior surface 33, and an exterior surface 35.

The first outer diameter is slightly less than the second inner diameter, so that when the individual sections 20, 30, 40, are assembled serially together end-to-end, the respective end portions are slidingly fit together in the following manner: Open section second end 24 of first section 20 is nestedly and fittingly received within open section first end 32 of second section 30 such that the exterior surface 25 of first section 20 is confrontingly adjacent to the interior surface 33 of second section 30. Likewise, open section first end 42 of third section 40 is nestedly and fittingly received within open section second end 34 of second section 30 such that the exterior surface 45 of third section 40 is confrontingly adjacent to the interior surface 33 of second section 30. In the preferred embodiment, the differences between the first outer diameter and second inner diameter are small enough to provide a friction fit between the mating sections, so as to maintain the relative position of the sections once assembled. However, the differences between the first outer diameter and second inner diameter are large enough to allow manual adjustment it relative position of the sections. This allows fine adjustment of the length of convection pipe 10, as well as the position of angle 60 within the overall length of convection pipe 10.

In the most preferred embodiment, for use in large turkey 5 (more than thirty pounds), convection pipe 10 comprises four short, individual sections 20, 30, 40, 50 of hollow tube. These four sections comprise first section 20, second section 30, and third section 40 as described above, as well as fourth section 50. Fourth section 50 is provided with the same outer and inner diameters as used with second section 30, that is, the second outer diameter and second inner diameter. It is also provided with an open section first end 52, an open section second end 54, a section mid portion 56 which lies between the open section first end 52 and the open section second end 56, an interior surface 53, and an exterior surface 55. In use, fourth section 50 may be employed at pipe second end 64 as follows: Open section second end 44 of third section 40 is nestedly and fittingly received within the open section first end 52 of fourth section 50 such that the exterior surface 45 of third section 40 is confrontingly adjacent to the interior surface 53 of fourth section 50 (see FIG. 2).

Figure 5:
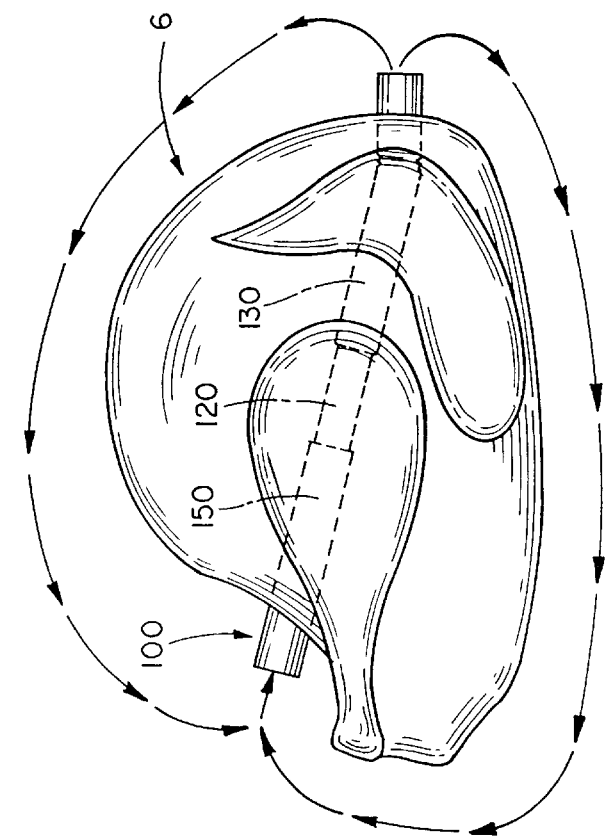
FIG. 5 is a side view of a stuffed poultry showing the poultry convection pipe in phantom and with arrows illustrating the oven heat being convected through the center of the stuffed poultry.

As an alternative configuration, so as to accommodate anatomical differences in various poultry, fourth section 50 may be employed at pipe first end 62 by securing it in series with first section 20 rather than third section 40. As shown in FIG. 5, this alternative configuration is as follows: open section first end 22 of first section 20 (120) is nestedly and fittingly received within the open section second end 54 of fourth section 50 (150) such that the exterior surface 25 of first section 20 (120) is confrontingly adjacent to the interior surface 53 of fourth section 50 (150).

Thus, the over all length of convection pipe 10 may be adjusted in two different ways. Gross adjustment is accomplished by selecting a combination of two, three, or four individual sections to accommodate poultry size. Fine adjustment, and correct placement of angle 60 within turkey 5, is accomplished by telescopic sliding of the individual sections relative to each other.

Preferably, each individual section 20, 30, 40, 50 is provided having an approximate length in the range of 4.5 to 6 inches. In the most preferred embodiment, for use in large turkey 5 (more than thirty pounds), each individual section 20, 30, 40, 50 is provided having an approximate length of 6 inches. Thus, assuming a segment overlap of ¼ inch at the mating end of each segment, the overall convection pipe length is approximately 21 inches. It is, however, well within the scope of the invention to provide each individual section 20, 30, 40, 50 in a length which slightly longer or shorter, so as to accommodate variations in poultry size.

Convection pipe 10 is preferably formed of a light gauge tinned sheet metal, and is provided with an outer diameter which is generally in the range of in the range of ⅝ inch to ¾ inch. This range is suitable for use in large stuffed poultry, such as a turkey. However, it is well within the scope of this invention to provide a convection pipe 10 which has a much smaller general outer diameter so as to accommodate much smaller poultry, such as cornish hen or fryer chicken. It is also well within the scope of this invention to provide a convection pipe 10 which is formed from alternative materials when those materials can provide heat transfer properties which are similar to metal.

Figure 6:
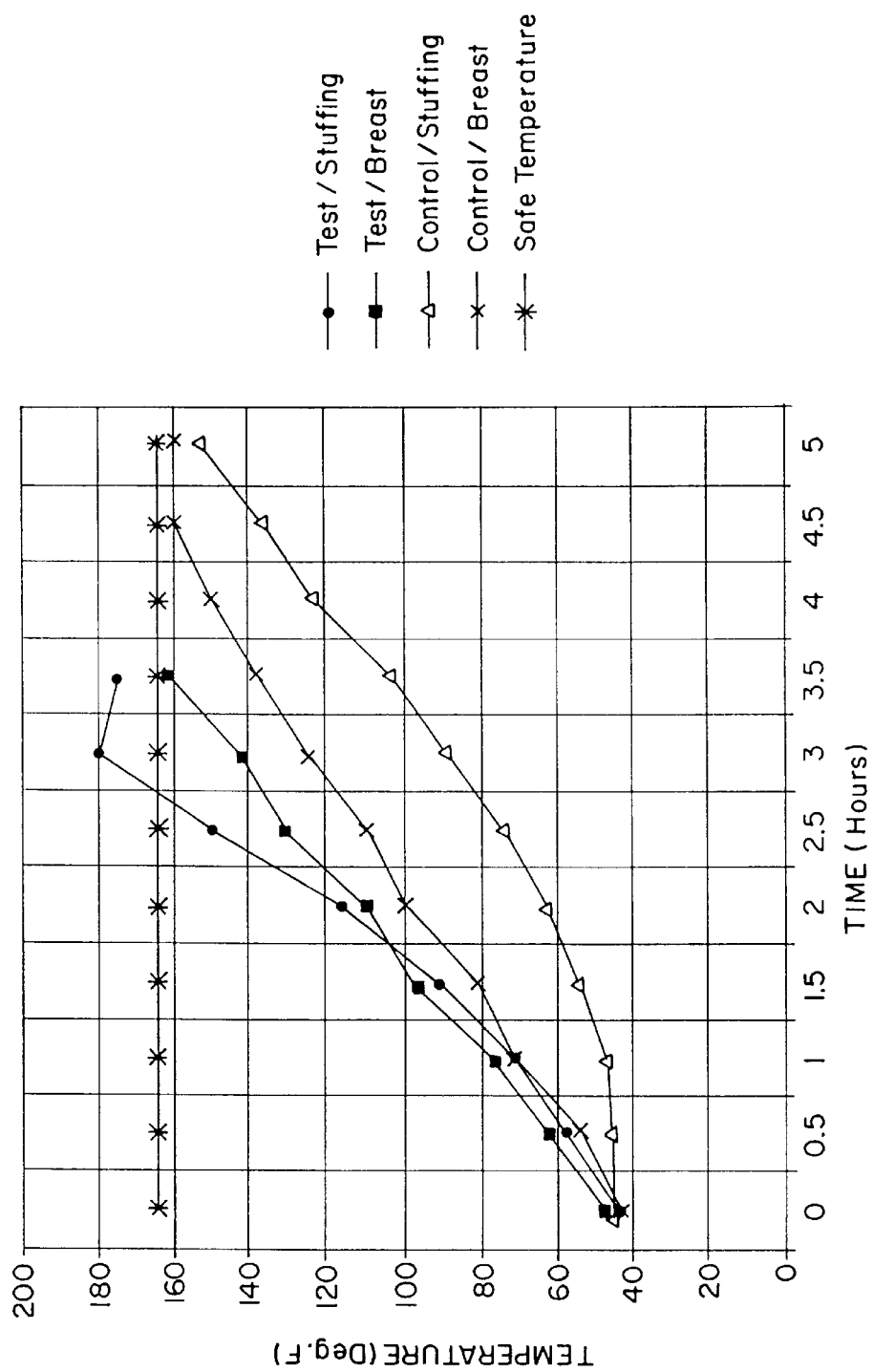
FIG. 6 is a chart which illustrates both the faster time to safe eating temperature of both the breast meat and the stuffing of the stuffed poultry cooked using the poultry convection pipe (test) compared to the stuffed poultry cooked without the poultry convection pipe (control), and the improved overall uniformity of interior temperature of the test poultry compared to the nonuniformity of the control poultry.

In the preferred embodiment, convection pipe 10 is provided having at least a ⅝ inch diameter so as to ensure unrestricted airflow through the stuffed poultry during cooking. This convective airflow, shown using arrows in FIG. 5, allows the stuffing and interior of the poultry to cook at approximately the same rate as its exterior. FIG. 6 is a chart which illustrates the improvement in overall cooking rate, as well as uniformity of cooking rate between the internal (stuffing) and exterior (breast meat) temperatures over time, when poultry is cooked using the innovative convection pipe 10. Thus, both the breast meat and stuffing reached a safe cooking temperature at approximately the same time, and much sooner than a stuffed poultry which was cooked without the inventive device.

As illustrated in FIGS. 1 and 2, angle 60 is preferably provided as rigid and nonadjustable such that first longitudinal axis 70 intersects second longitudinal axis at a fixed angle. This angle is preferably selected from a range of angles, the range of angles being 15 to 30 degrees. In the most preferred embodiment, angle 60 is provided as 22.5 degrees.

Figure 4:
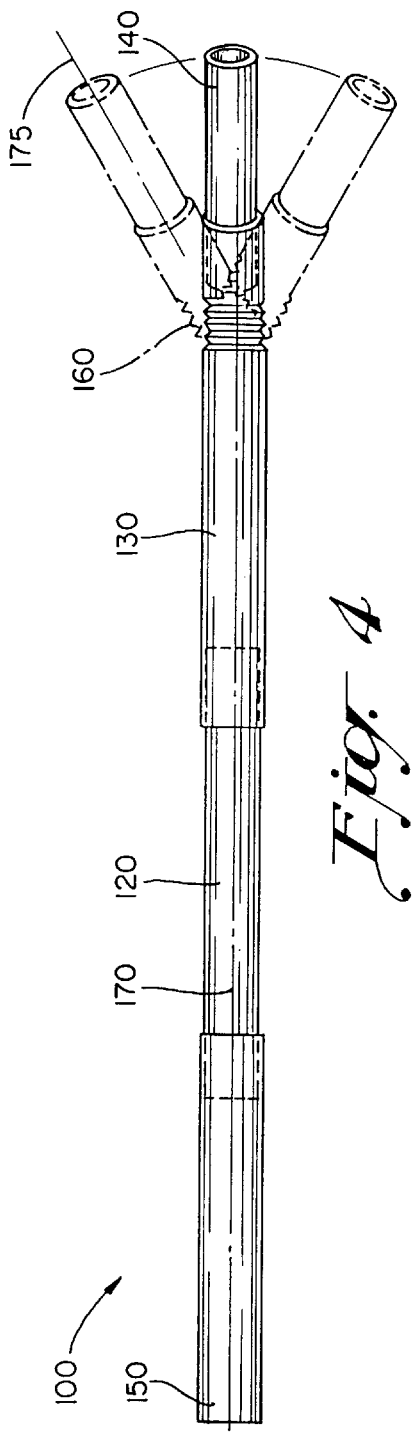
FIG. 4 is a side view of a second embodiment of the poultry convection pipe illustrating an adjustment means within the angled portion which is selectively adjustable through a range of angles.

An alternative embodiment is illustrated in FIGS. 4 and 5. These figures illustrate convection pipe 100 comprising a selective angle adjustment means 160 such that the first longitudinal axis 170 intersects the second longitudinal axis 175 at an angle which is selected by the user from a range of angles, the range of angles comprising 15 degrees to 30 degrees. The angle adjustment means comprises a plurality of selectively expandable and compressible circumferential pleats formed in the tube wall within the angled portion. The pleats are provided with sufficient stiffness so as to maintain the selected angle once so configured. Selective angle adjustment means 160 allow the user to configure convection pipe 100 such that it lies in the proper orientation within the body cavity of the poultry, allowing the user to compensate for anatomical differences in various poultry.

While changes may be made in the detail construction within the skill of those knowlegeable in the art, it shall be understood that such changes shall be within the spirit and scope of the present invention, as defined by the appended claims.

I claim:

1. An apparatus for fast and uniform cooking of stuffed poultry, the apparatus comprising an elongate hollow tube of uniform diameter, the elongate hollow tube having an open first end, an open second end, a mid portion which separates the first end from the second end, and a tube wall which separates the hollow interior from the exterior, the first end comprising a first longitudinal axis, the second end comprising a second longitudinal axis, wherein said first longitudinal axis is non-parallel to the second longitudinal axis, and wherein said first longitudinal axis intersects the second longitudinal axis so as to form an angled portion, the angled portion residing within the mid portion.

2. The apparatus of claim 1 wherein said elongate hollow tube comprises a plurality of short, individual, and separatable sections of hollow tube, each of the plurality of sections of hollow tube comprising a section first end, a section second end, and a section mid portion which separates the section first end from the section second end, one of said plurality of sections of hollow tube comprising said angled portion residing within its section mid portion, each of the plurality of sections of hollow tube being assembled together in series with the remaining sections of the plurality of sections of hollow tube such that when all individual sections of each of the plurality of sections are joined section first end to adjacent section second end, the result is a single, elongate hollow tube having individual sections which are assembled so as to telescope relative to each other.

3. The apparatus of claim 2 wherein said plurality of sections of hollow tube comprises at least two sections of hollow tube.

4. The apparatus of claim 2 wherein said plurality of sections of hollow tube comprises at least three sections of hollow tube.

5. The apparatus of claim 2 wherein said elongate hollow tube comprises an outer diameter in the range of ⅝ inch to ¾ inch.

6. The apparatus of claim 2 wherein said angled portion is provided with an angle adjustment means such that said first longitudinal axis intersects the second longitudinal axis at an angle selected from a range of angles, the range of angles comprising 15 degrees to 30 degrees.

7. The apparatus of claim 6 wherein the angle adjustment means comprises a plurality of selectively expandable and compressible circumferential pleats formed in the tube wall within the angled portion.

8. The apparatus of claim 2 wherein said angled portion is rigid and nonadjustable such that said first longitudinal axis intersects the second longitudinal axis at an angle of 22.5 degrees.

9. A combination cooking device and stuffed poultry, wherein the stuffed poultry comprises a dressed poultry comprising a tail end, a neck end, and an eviscerated body cavity filled with edible stuffing, wherein the cooking device comprises an elongate hollow tube of uniform diameter, the elongate hollow tube comprising a first end, a second end, and a mid portion, the elongate hollow tube comprising an angled portion located in the mid portion thereof, the cooking device positioned within body cavity of the stuffed poultry such that it is surrounded by and supported by the stuffing, such that the first end of said elongate hollow tube extends out from the tail end of the stuffed poultry, such that the second end of said elongate hollow tube extends out from the neck end of the stuffed poultry, and such that the second end and the angled portion lie below the first end, the cooking device being open and unobstructed so that air can pass freely through the cooking device.

10. The combination cooking device and stuffed poultry of claim 9 wherein the cooking device is provided with a length adjustment means.

11. The combination cooking device and stuffed poultry of claim 10 wherein the length adjustment means comprises the elongate hollow tube comprising a plurality of individual sections of hollow tube, each of the plurality of individual sections of hollow tube comprising a section first end, a section second end, and a section mid portion which separates said section first end from said section second end, each of the plurality of individual sections of hollow tube being assembled together in series with the remaining sections of the plurality of individual sections of hollow tube such that when all individual sections of each of the plurality of individual sections are joined section first end nested with adjacent section second end, the result is a single, elongate hollow tube having individual sections which are assembled so as to telescope relative to each other providing a cooking device of selectively variable length.

12. The combination cooking device and stuffed poultry of claim 11 wherein the cooking device is provided with an angle adjustment means.

13. The combination cooking device and stuffed poultry of claim 12 wherein the angle adjustment means comprises a plurality of selectively expandable and compressible circumferential pleats formed in the tube wall within the angled portion.

14. A cooking device for quick and uniform cooking of stuffed poultry, the cooking device comprising a combination of multiple individual sections of elongate hollow tube, each individual section of said multiple individual sections comprising an open section first end, an open section second end, and a section mid portion which separates the section first end from the section second end, one section of said multiple individual sections of comprising an angled portion residing within its section mid portion such that its section first end is not coaxial with its section second end, each individual section of said multiple individual sections being assembled together in series with the remaining individual sections of said multiple individual sections such that each single individual section of each of the plurality of individual sections is joined to the remaining individual sections such that its section first end is slidingly nested with the section second end of the adjacent individual section, wherein when each individual section is assembled to the remaining individual sections the result is a single elongate hollow tube which is generally uniform in diameter.

15. The cooking device of claim 14 where the overall length of the cooking device is provided with a gross adjustment means and a fine adjustment means, wherein said gross adjustment means comprises using greater or fewer numbers of each individual sections to for said cooking device so as to obtain a cooking device of approximate desired size, and wherein said fine adjustment means comprises telescopically sliding each individual section of said multiple individual sections relative to said remaining individual sections of said multiple individual sections so as to obtain a cooking device of exactly desired size.

16. The cooking device of claim 15 wherein said angled portion is rigid and nonadjustable.

17. The cooking device of claim 15 wherein said angled portion provided with an angle adjustment means.

18. The cooking device of claim 17 wherein each individual section of said multiple individual sections comprises a tube wall which separates the hollow interior from the exterior, and wherein said angle adjustment means comprises a plurality of selectively expandable and compressible circumferential folds formed in the tube wall within the angled portion.

19. The cooking device of claim 18 wherein said angle adjustment means provides a means by which the angle within the angled portion may be selectively adjusted to any angle within a range of angles, the range of angles comprising 15 degrees to 30 degrees.

20. The cooking device of claim 19 wherein when each individual section is assembled with the remaining individual sections the result is a single elongate hollow tube which is generally uniform in diameter and comprises an outer diameter in the range of ⅝ inch to ¾ inch.

21. A cooking device for quick and uniform cooking of stuffed poultry, the cooking device comprising three sections of hollow elongate tube, said three sections comprising a first section, a second section, and a third section, said first section and said third section each comprising a first outer diameter and a first inner diameter, an open first end, an open second end, a mid portion which lies between the open first end and the open second end, an interior surface, and an exterior surface, said second section comprising a second outer diameter and a second inner diameter, an open first end, an open second end, a mid portion which lies between the open first end and the open second end, an interior surface, and an exterior surface, wherein said first outer diameter is less than said second inner diameter, wherein said second end of said first section is nestedly and fittingly received within the first end of said second section such that the exterior surface of said first section is confrontingly adjacent to the interior surface of said second section, wherein the first end of the third section is nestedly and fittingly received within the second end of the second section such that the exterior surface of said third section is confrontingly adjacent to the interior surface of the second section.

22. The cooking device of claim 21 wherein the cooking device further comprises a fourth section of hollow elongate tube, said fourth section comprising said second outer diameter and said second inner diameter, an open first end, an open second end, a mid portion which lies between the open first end and the open second end, an interior surface, and an exterior surface, wherein the second end of the third section is nestedly and fittingly received within the first end of the fourth section such that the exterior surface of the third section is confrontingly adjacent to the interior surface of the fourth section.

23. The cooking device of claim 21 wherein the cooking device further comprises a fourth section of hollow elongate tube, said fourth section comprising said second outer diameter and said second inner diameter, an open first end, an open second end, a mid portion which lies between the open first end and the open second end, an interior surface, and an exterior surface, wherein the first end of the first section is nestedly and fittingly received within the second end of the fourth section such that the exterior surface of the first section is confrontingly adjacent to the interior surface of the fourth section.

24. The cooking device of claim 21 wherein the first end of the second section comprises a first longitudinal axis, the second end of the second section comprises a second longitudinal axis, wherein said first longitudinal axis is nonparallel to the second longitudinal axis, and wherein said first longitudinal axis intersects the second longitudinal axis so as to form an angled portion, the angled portion residing within the mid portion of the second section.

25. The cooking device of claim 24 wherein said angled portion is provided with a selective angle adjustment means such that said first longitudinal axis intersects the second longitudinal axis at an angle selected from a range of angles, the range of angles comprising 15 degrees to 30 degrees.

26. The cooking device of claim 25 wherein the angle adjustment means comprises a plurality of selectively expandable and compressible circumferential pleats formed in the tube wall within the angled portion.

27. The cooking device of claim 25 wherein each of said sections of elongate hollow tube are formed of light gauge tinned sheet metal.

28. The cooking device of claim 24 wherein said angled portion is rigid and nonadjustable such that said first longitudinal axis intersects the second longitudinal axis at an angle of 22.5 degrees.

29. The cooking device of claim 28 wherein each of said sections of elongate hollow tube are formed of light gauge tinned sheet metal.

* * * * *